United States Patent
Talley et al.

(10) Patent No.: US 9,154,902 B1
(45) Date of Patent: Oct. 6, 2015

(54) METHOD AND SYSTEM FOR CONTROLLED BROADCASTING OF SYSTEM IDENTIFICATION

(75) Inventors: Ryan S. Talley, Overland Park, KS (US); Shilpa K. Srivinas, Brambleton, VA (US); Muralidhar Malreddy, Overland Park, KS (US); Kyle C. Allen, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 715 days.

(21) Appl. No.: 13/440,454

(22) Filed: Apr. 5, 2012

(51) Int. Cl.
*H04W 4/00* (2009.01)

(52) U.S. Cl.
CPC .................................. *H04W 4/00* (2013.01)

(58) Field of Classification Search
CPC . H04W 36/00; H04W 52/244; H04W 84/045; H04W 60/00
USPC ......................................................... 455/434
See application file for complete search history.

(56) References Cited

U.S. PATENT DOCUMENTS

| | | | |
|---|---|---|---|
| 7,542,451 | B2 | 6/2009 | Cooper et al. |
| 2009/0092080 | A1 | 4/2009 | Balasubramanian et al. |
| 2010/0075658 | A1 | 3/2010 | Hou et al. |
| 2010/0085945 | A1* | 4/2010 | Williams ................ 370/336 |
| 2010/0279689 | A1* | 11/2010 | Tinnakornsrisuphap et al. ................ 455/435.2 |
| 2011/0128916 | A1 | 6/2011 | Kwon et al. |
| 2014/0199998 | A1* | 7/2014 | Balasubramanian et al. 455/434 |

OTHER PUBLICATIONS

U.S. Appl. No. 12/759,347, filed Apr. 13, 2010.

* cited by examiner

*Primary Examiner* — Shahriar Behnamian (57) ABSTRACT

A method and system for controlling broadcast of system identification. A base station may broadcast in one or more timeslots of a control channel, as a System Identifier (SID) of the base station, a particular SID, but may broadcast in one or more other timeslots of the control channel, as a SID of the base station, a different SID. In addition, when a mobile station registers to be served by the base station, the base station may determine which slot(s) of the control channel the mobile station will monitor and may broadcast in the determined slot(s) a SID that may help to keep the mobile station from transitioning to be served by a different base station.

20 Claims, 7 Drawing Sheets

METHOD AND SYSTEM FOR CONTROLLED BROADCASTING OF SYSTEM IDENTIFICATION

BACKGROUND

Unless otherwise indicated herein, the materials described in this section are not prior art to the claims and are not admitted to be prior art by inclusion in this section.

Many people use mobile stations, such as cell phones and personal digital assistants, to communicate with cellular wireless networks, which may provide communication services such as voice, text messaging, and packet-data communication to these mobile stations. The mobile stations and networks may communicate with each other over a radio frequency (RF) air interface according to an agreed air interface protocol, such as CDMA, LTE, WiMAX, GSM, WIFI, BLUETOOTH, and others now known or later developed.

Mobile stations may conduct these wireless communications with one or more base station systems, each of which may send communications to and receive communications from mobile stations over the air interface and may, together with associated network infrastructure, provide connectivity with one or more transport networks such as the public switched telephone network (PSTN) or the Internet for instance. With this arrangement, mobile stations may be able to communicate via a base station system with one or more remote endpoints such as other mobile stations or nodes accessible through one or more transport networks.

When mobile stations are powered on, reset, temporarily lose a signal, or for some other reason are seeking a connection to a network, they may be arranged to scan for wireless networks with reference to an internal table that is typically known as a preferred roaming list (PRL). For a given geographic region, the PRL may list wireless networks in a priority order, identifying each network by a system identifier (SID) and carrier frequency, among possibly other information. Each base station system in the region may then belong to a particular network and thus have an associated SID, and may broadcast that SID on one or more air interface control channels so that mobile stations scanning for a network may detect the SID and determine by reference to their PRL whether to connect with the base station system.

In practice, a mobile station may scan for coverage in descending order of network preference as indicated by the mobile station's PRL, until the mobile station successfully detects a base station system broadcasting a listed SID. At that point, the mobile station may then register to be served by the base station system and its associated network infrastructure. For instance, the mobile station may wirelessly transmit a radio access registration request message to the base station system, which may trigger update of a record in the network to indicate that the mobile station is operating within coverage of the base station system, and the mobile station may receive a registration response message acknowledging the registration.

Once a mobile station has registered with a base station system or is otherwise within coverage of a base station system, the mobile station may monitor control channel transmissions from the base station system in order to receive any relevant system information and any messages specifically addressed to the mobile station. For instance, the mobile station may monitor an air interface paging channel of the base station system to receive base station system parameters and page messages addressed to the mobile station. To conserve battery power, the mobile station may be arranged to carry out this monitoring process in a "slotted mode," in which the mobile station generally operates in a low-power sleep state but wakes up (enters into a more full power/reception state) periodically to read particular timeslots of the paging channel. The base station system may then be arranged to transmit any information specifically for that mobile station, such as page messages, in one or more of those particular timeslots.

From time to time when a mobile station monitors control channel transmissions from the base station, the mobile station may read the SID of the base station as broadcast on a control channel, and the mobile station may determine from its PRL whether any higher priority networks exist in the region. If the mobile station determines from the PRL that one or more higher priority networks exist in the region, the mobile station may then repeat the system selection process described above and may thereby detect and register with a more preferred base station system. On the other hand, if the mobile station determines from the PRL that the SID of the currently serving base station system is the highest priority in the region, then the mobile station need not repeat the system selection process.

OVERVIEW

One issue that can arise in the process described above is that a mobile station may be in an area of overlap between coverage of multiple base station systems, and it may be desirable for a particular one of the base station systems to serve the mobile station, but that particular base station system may have a SID that the mobile station's PRL lists with lower priority than the SID of another one of the base station systems. In that scenario, the mobile station would likely select the higher priority base station system and would thus not be served by the more desirable base station system.

An example of this situation is where a user of the mobile station operates a femto base station in the user's home or office but where a nearby macro base station also provides coverage at the same location, but where the femto base station has a particular SID and the macro base station has a different SID and the mobile station's PRL lists the macro base station's SID with higher priority than the femto base station's SID. In that scenario, it may be desirable for the mobile station to be served by the femto base station (e.g., to offload macro air interface traffic, and to provide improved signal strength for the mobile station). However, because the PRL lists the macro base station's SID as higher priority, the mobile station may opt to be served by the macro base station rather than the femto base station.

One solution to this problem is to change the SID of the femto base station to be the same SID as the macro base station or, if possible, to be a SID that the mobile station's PRL lists with higher priority than the SID of the macro base station. That way, when the mobile station detects the SID broadcast by the femto base station, (i) if the SID is the same as that of the macro base station but the femto base station signal is sufficiently strong, then the mobile station may opt to be served by the femto base station and (ii) if the SID is higher priority than that of the macro base station, then the mobile station may opt to be served by the femto base station.

An issue with this solution, however, is that there may be some mobile stations whose PRLs do not list that higher priority SID. This can be the case, for instance, where the higher priority SID was introduced recently, perhaps in correspondence with a newly implemented frequency band class and/or air interface protocol, and legacy mobile stations have not been provisioned with a PRL listing that SID (possibly because they mobile stations are not equipped to operate on the new band class and/or air interface protocol). Consequently, when those mobile stations engage in the system selection process, they would disregard the unknown SID broadcast by the femto base station and would thus not opt to be served by the femto base station.

Another solution to the problem is to arrange the femto base station to broadcast a pilot beacon that would cause a mobile station being served by the macro base station to transition to instead be served by the femto base station. In particular, the femto base station could include in such a pilot beacon one or more control channels that specify as a SID of the femto base station the same SID as the macro base station or, if possible, a SID that the mobile station's PRL lists with higher priority than the SID of the macro base station. (If the macro base station operates on a different carrier frequency than the femto base station, the femto base station could broadcast this pilot beacon on the macro base station's carrier frequency, and the pilot beacon may include signaling (such as a specially configured channel list message or a system redirect message) that may cause a mobile station reading the pilot beacon to transition to the femto base station's carrier frequency.) That way, when the mobile station detects the pilot beacon of the femto base station and reads the SID broadcast in the pilot beacon, (i) if the SID is the same as that of the macro base station but the femto base station signal is sufficiently strong, then the mobile station may transition to be served by the femto base station and (ii) if the SID is higher priority than that of the macro base station, then the mobile station may transition to be served by the femto base station.

Unfortunately, however, an issue may exist with this solution as well. In particular, although the femto base station's pilot beacon may use the higher priority SID to cause a mobile station to transition to be served by the femto base station, the mobile station may then read the actual SID of the femto base station as broadcast by the femto base station, and the mobile station may determine that the femto base station's SID is not the highest priority SID listed in the mobile station's PRL. Consequently, the mobile station may repeat the system selection process described above and may thus detect and register with the macro base station. Yet once the mobile station has registered with the macro base station, the mobile station may again receive the pilot beacon of the femto base station and again transition to the femto base station. This process may thus repeat continuously, with the mobile station "ping-ponging" between the femto base station and the macro base station, which can undesirably drain the mobile station's battery power and cause other user experience issues.

Disclosed herein is an improved method and corresponding system that may help to resolve this issue. In an example implementation of the method, a base station system may alternate between broadcasting at least two different SIDs, in an effort to attract various mobile stations to be served by the base station system. Further, when a mobile station registers with the base station system, the base station system may determine which one or more timeslots of a control channel the mobile station will be monitoring and may responsively broadcast in the determined one or more timeslots, as a SID of the base station system, a different SID than the base station system broadcasts, as a SID of the base station, in one or more other timeslots of the control channel.

Accordingly, in one respect, disclosed is a method that may be carried out by a base station system including a base station and perhaps various supporting network infrastructure. According to the method, the base station system may receive wirelessly from a mobile station a radio access registration request message seeking to register the mobile station to be served by the base station system, and the base station system may responsively engage in a registration procedure to register the mobile station to be served by the base station system.

Further, the base station system may determine (perhaps during or after the registration procedure) which one or more timeslots of a control channel broadcast by the base station system the mobile station will monitor while being served by the base station system. Based on that, the base station system may then broadcast in the determined one or more timeslots of the control channel, as a SID of the base station system, a first SID that is different than a second SID that the base station system broadcasts, as the SID of the base station system, in one or more other timeslots of the control channel. Optimally, the first SID may be a SID that would help keep the mobile station from transitioning to be served by a different base station system.

In another respect, disclosed is another method that may be carried out by a base station system similarly including a base station and perhaps various supporting network infrastructure. According to the method, the base station system may alternate between at least broadcasting on a control channel, as a SID of the base station system, a first SID, and broadcasting on the control channel, as the SID of the base station system, a second SID different than the first SID. Further, the base station system may register a mobile station to be served by the base station system and may determine (i) that a PRL of the mobile station lists the first SID but not the second SID and (ii) which one or more timeslots of the control channel the mobile station will monitor. Responsive to that determination, the base station system may then broadcast the first SID in the one or more timeslots of the control channel, though the base station system may still continue to alternate between broadcasting the first SID and the second SID.

In still another respect, disclosed is a base station system that includes an antenna structure for engaging in air interface communication, a processing unit, data storage, and program instructions stored in the data storage and executable by the processing unit to carry out various functions. In particular, the functions may include receiving via the antenna structure from a mobile station a radio access registration request message seeking to register the mobile station to be served by the base station system, and causing the antenna structure to transmit to the mobile station a registration response message to acknowledge registration of the mobile station to be served by the base station system. Further, the functions may include determining which one or more timeslots of an air interface control channel broadcast by the base station system the mobile station will monitor while being served by the base station system. And the functions may include, based on at least that determination, causing the antenna structure to broadcast in the determined one or more timeslots of the air interface control channel, as a SID of the base station system, a first SID that is different than a second SID that the antenna structure broadcasts, as the SID of the base station system, in one or more other timeslots of the air interface control channel.

Still further, in yet another respect, disclosed is a method that may likewise be carried out by a base station system including a base station and perhaps various supporting network infrastructure. According to the method, the base station system may wirelessly broadcast signaling information on an air interface control channel that defines a continuum of timeslots. Further, the base station system may alternate between broadcasting on the air interface control channel, as a SID of the base station system, a first SID, and broadcasting on the air interface control channel, as the SID of the base station system, a second SID that is different than the first SID.

These as well as other aspects, advantages, and alternatives will become apparent to those of ordinary skill in the art by reading the following detailed description, with reference where appropriate to the accompanying drawings. Further, it should be understood that the description provided by this document, including this overview section, is provided merely by way of example and without limitation.

DETAILED DESCRIPTION

For simplicity of illustration, the present method and system will be described by way of example with respect to a network arrangement providing both a femto base station system and a macro base station system. That arrangement, like others disclosed herein, should not be taken as limiting however. The method and system could apply in other scenarios as well, such as with respect to any base station system. Likewise, any air interface protocols or specific parameters of arrangements described herein should be considered as mere examples, subject to variation.

Referring to the drawings, as noted above, FIG. 1 is a simplified block diagram of an example network arrangement in which the present method can be implemented. As shown, the arrangement includes a representative macro radio access network (macro RAN) 12 and a representative wireless local area network (WLAN) 14, both arranged to serve a representative mobile station 16 and to provide the mobile station with access to one or more transport networks 18 such as the PSTN and/or the Internet for instance.

Figure 1:
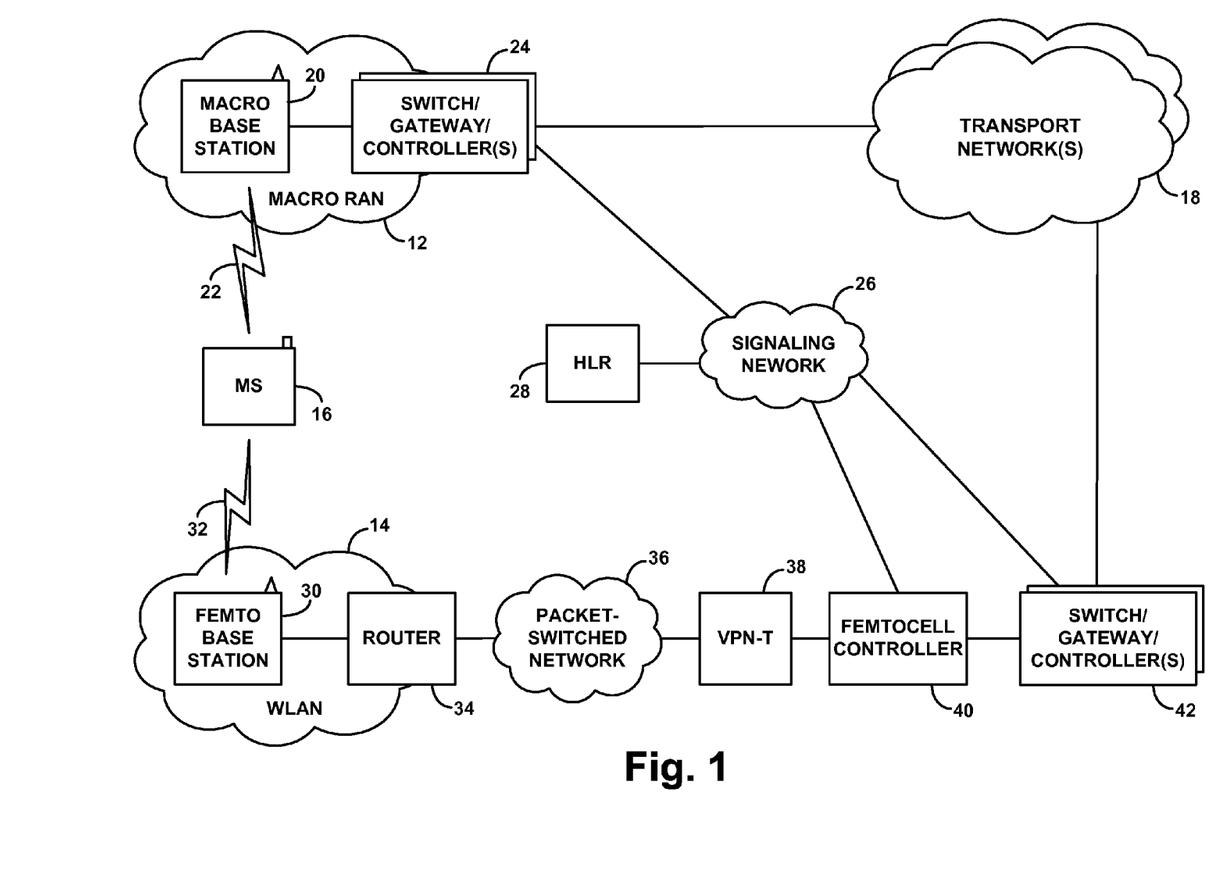
FIG. 1 is a simplified block diagram of an example network arrangement in which the present method can be implemented.

In practice, macro RAN 12 may be owned and operated by a wireless service provider, such as a cellular carrier for instance, and a user of mobile station 16 may subscribe to service with that wireless service provider. WLAN 14, on the other hand, may be owned and operated by another entity, such as the user of the mobile station for instance. Alternatively, the macro RAN 12 and WLAN 14 may be owned and/or operated by the same entity or by various other entities.

As shown in FIG. 1, the macro RAN 12 includes a macro base station 20 (perhaps one of many), which would typically include an antenna configuration and associated equipment for radiating to define one or more coverage areas in which the mobile station 16 can wirelessly communicate with the macro base station 20 over an air interface 22. Macro base station 20 (which may also be referred to as an access node, an eNodeB, an access point, or the like) may operate according to one or more defined air interface protocols, such as CDMA, LTE, WiMAX, GSM, WIFI, BLUETOOTH, or any other protocol now known or later developed. Further, mobile station 16 may be arranged to operate according to the same air interface protocol, so that the mobile station can communicate with the macro base station 20 and gain access to transport network(s) 18 via the macro RAN 12.

Macro RAN 12 further includes various entities 24 such as switches, gateways, and controllers that may facilitate providing connectivity with transport network(s) 18 and may further help to control aspects of macro RAN operation, such as registration and de-registration of mobile stations for instance. By way of example, the macro RAN 12 may include a base station controller (BSC), a radio network controller (RNC), a mobile switching center (MSC), a soft-switch, a media gateway controller (MGC), a packet data serving node (PDSN), a serving gateway (S-GW), a packet data network gateway (P-GW), and/or a mobility management entity (MME) for instance, which may function to provide connectivity between macro base station 20 and transport network(s) 18. As shown, one or more of entities 24 may also be coupled with a signaling network 26 to facilitate communication with additional entities, such as a home location register (HLR) (e.g., home subscriber server (HSS)) 28 for instance.

Depending on the implementation, some or all of the entities 24 or other entities may be considered to be part of the macro RAN 12 and may interwork with the macro base station to cooperatively define a macro base station system. Alternatively, the macro base station itself may be considered a macro base station system.

HLR 28 may function to store service profile records for mobile stations that subscribe to service of the wireless service provider. For each such mobile station, the service profile record may indicate services that the mobile station is entitled to receive or engage in, such as abbreviated dialing, call forwarding, and the like. Further, the HLR may keep track of what portion of the cellular radio access system is serving the mobile station at any given time. For instance, the HLR may maintain for each mobile station a record of the base station, switch, gateway or other node currently serving the mobile station, or last known to be serving the mobile station. When an entity seeks to route a communication to the mobile station, the entity may thus query the HLR to determine the node currently serving the mobile station and may then route the communication to that node to facilitate paging and routing of the communication to the mobile station.

WLAN 14 is shown including a femto base station 30 (which may also be referred to as a femtocell, microcell, picocell, low cost Internet base station, personal cellular base station, or by other names). Femto base station 30 may be essentially a small scale version of macro base station 20, including an antenna configuration and associated equipment for radiating to define one or more coverage areas in which the mobile station 16 can wirelessly communicate with the femto base station 30 over an air interface 32, and operating according to one or more defined air interface protocols such as those noted above for instance. Femto base station 30 may conveniently be the size of a typical WIFI access point, suitable for positioning in a home, office, or other location, and may be provided (e.g., sold or otherwise distributed) by the same wireless service provider that owns and operates macro base station, as a value-added device to help subscribers obtain enhanced coverage and service.

As shown, the femto base station 30 is coupled with a router 34, which provides connectivity (e.g., through one or more nodes such as a cable modem, DSL modem, or the like)

with a broadband packet-switched network 36 such as the Internet. In turn, coupled with or accessible via network 36 is then a virtual private network terminator (VPN-T) 38, which is communicatively linked in turn with a femtocell controller 40 that connects with one or more entities 42 such as switches, gateways, and controllers of the type noted above for instance. Entities 42 may then provide connectivity with transport network(s) 18 and may further connect with signaling network 26. In practice, some or all of entities 42 may be one or more of entities 24. Likewise, other illustrate components could be combined, distributed, or otherwise modified.

With this arrangement, the femto base station 30 may have an Internet Protocol (IP) address (statically or dynamically assigned) for communication on network 36 or may operate through network address translation by router 34 to communicate on network 36. Upon power on and/or at another time, the femto base station 30 may programmatically communicate over network 36 with VPN-T to establish a VPN through which the femto base station 30 can communicate over network 36. Through that VPN, femto base station 30 may then communicate with a server such as a femtocell controller 40, and via femtocell controller 40 with entities 42. Consequently, femto base station 30 may be in communication with entities 42 (through a VPN connection over broadband network 36) much the same as macro base station 20 is in communication with entities 24.

Depending on implementation, various entities may interwork with the femto base station 30 to cooperatively define a femto base station system. For instance, the femtocell controller 40 and/or various ones of entities 42 may interwork femto base station to cooperatively define a femto base station system. Alternatively, the femto base station 30 itself may be considered a femto base station system.

In general, a base station such as femto base station 30 and macro base station 20 may be arranged to broadcast signaling information on certain defined air interface control channels. Depending on the air interface protocol in use, these channels could be structured in various ways, such as through code division multiplexing, time division multiplexing, and/or frequency division multiplexing for instance. In some implementations, these channels may include a pilot channel (e.g., reference channel) that mobile stations can detect as an indication of presence of base station coverage, a sync channel that may carry various system information such as an indication of the base station's SID for instance, and a paging channel that may also carry such system information and may further carry mobile station specific signaling such as page messages for instance.

When a mobile station seeks to be served by a particular base station, the mobile station may engage in a registration (e.g., attach) procedure so as to then be able to exchange user data to the extent the mobile station's service profile and capabilities allow, such to place and receive calls and engage in wireless packet-data communication for instance.

For example, upon detecting a sufficiently strong pilot signal broadcast by the base station and perhaps after then reading the sync channel of the base station to determine the base station's SID and determining from a PRL that the SID is authorized, the mobile station may transmit to the base station on an uplink air interface channel (such as an access channel) a radio access registration request (e.g., attach request) message. Upon receiving that registration request message, the base station may then signal to one or more other entities of the system, such as one of entities 24, 42 for instance, which may in turn signal to the HLR 28. Through or in response to this signaling, the mobile station may be authenticated and its service subscription verified, and the HLR may receive an update indicating where in the network the mobile station is located. Further, the HLR may provide the base station and/or one or more of entities 42 with a copy of the mobile station's service profile for local storage and use to facilitate serving the mobile station, and a bearer communication channel may be set up to serve the mobile station. In turn, the base station may then transmit to the mobile station over an air interface control channel (such as a paging channel) a registration response (e.g., attached accept) message, acknowledging the registration.

Once the mobile station has thereby registered with the base station, the mobile station may engage in bearer data communications via the base station in accordance with the mobile station's service profile and capabilities. For instance, the mobile station may place and receive calls and engage in wireless packet-data communication. Further, as noted above, the mobile station may then enter a slotted mode in which the mobile station is in a low power state but wakes up periodically to read one or more timeslots of the paging channel, so as to obtain any relevant system information and any mobile station specific page messages.

Figure 2:
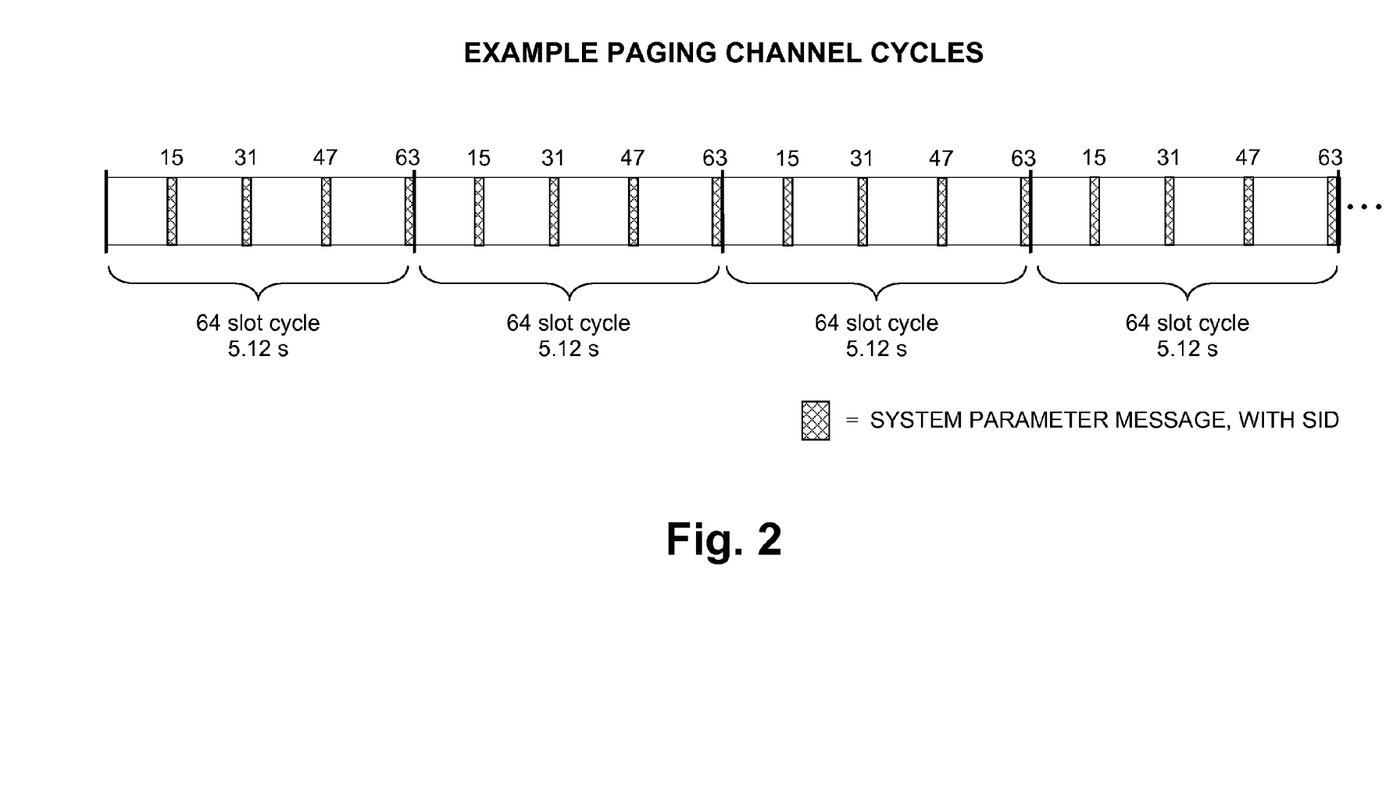
FIG. 2 is an illustration of a portion of a representative paging channel.

FIG. 2 depicts a portion of a representative paging channel to help illustrate how the slotted mode may work in practice. As shown in FIG. 2, the paging channel is divided into a continuum of timeslots, each of which may have a defined duration such as 80 milliseconds) for instance. These paging channel timeslots may define a recurring cycle of N timeslots, where N may be an integer such as $16 \times 2^{SCI}$, where SCI may be a slot cycle index of value 0, 1, or 2 for instance. Thus, each recurring cycle of timeslots may be 16, 32, or 64 slots, corresponding respectively with a duration of 1.28 seconds, 2.56 seconds, or 5.12 seconds. In the example shown, for instance, the cycle is 64 slots spanning 5.12 seconds. Thus, every 64 slots on the paging channel represents a next cycle on the paging channel.

In practice, the base station may be set to periodically broadcast on the paging channel a system parameter message that carries pertinent system information such as the base station's SID (e.g., a 15-bit identifier of the base station's system). For instance, the base station may be set to broadcast the system parameter message every 16 slots, and thus four times in each 64-slot cycle. In an example implementation, the system parameter message may span half of a slot, i.e., 40 milliseconds. As shown, for instance, the base station may broadcast the system parameter message in each cycle at slots 15, 31, 47, and 63.

As noted above, in the slotted mode, a mobile station may generally operate in a low power state but may wake up periodically to read one or more slots on the paging channel. In an example implementation, the mobile station would be set to wake up at a particular slot of each cycle, such as a particular slot of each 64 slot cycle (if SCI=0) for instance and to read a defined number of slots starting there, such as one or two slots for instance. When the mobile station registers with the base station, the mobile station may include in its registration request message or other signaling to the base station a specification of the slot at which the mobile station will wake up to begin reading the paging channel. The base station system may then record for that mobile station an indication of that slot. In turn, when the base station has a page message to send to the mobile station, the base station may broadcast that page message or an indication of the page message in the one or two slots that the mobile station is scheduled to read.

Furthermore, each time the mobile station wakes up to read the paging channel at its scheduled slot(s), the mobile station may also stay awake until the next system parameter message is broadcast and read the system parameter message to obtain any relevant system information (possibly changed from the last time the mobile station read it). For instance, if the mobile station is set to wake up at slot 23 of every cycle and to read two slots, the mobile station may do so in each cycle and may then stay awake until slot 31 where the next system parameter message would be broadcast and read that system parameter message.

In normal practice, a base station that broadcasts a pilot beacon may broadcast largely the same control channels on the pilot beacon that the base station broadcasts in normal operation, but the base station may additionally include in the pilot beacon a directive that causes a mobile station to transition to be served by the base station, such as to transition to the carrier frequency of the mobile station. As noted above, for instance, the base station may include in the pilot beacon a special channel list message or system redirect message that directs a mobile station to transition to operate on the base station's carrier frequency and perhaps to specifically be served by the base station on that frequency or to scan for coverage on that frequency.

As explained above, it would be desirable to have femto base station 30 broadcast as its SID a SID that is the same as or higher priority than the SID of nearby macro base station 20, so as to attract mobile stations to be served by the femto base station 30. However, as also noted above, a potential problem with this is that some mobile stations may not have that high priority SID listed in their PRL and may thus not respond to the SID being broadcast by the femto base station 30. Further, if the femto base station broadcasts the high priority SID in its pilot beacon to attract certain mobile stations to be served by the femto base station but then broadcasts a lower priority SID normally on its paging channel, those mobile stations may end up ping-ponging between the femto base station and the macro base station.

To help solve this problem, in one respect, the femto base station system may be arranged to alternate between values that it broadcasts as its SID, such as between broadcasting a first SID that legacy mobile stations may be provisioned to recognize and broadcasting a different second SID that newer mobile stations may be provisioned to recognize. The second SID may be the same as the SID used by the macro base station or higher priority (in mobile station PRLs) than the macro base station SID. The femto base station system may do this on its paging channel, sync channel, and/or other control channel(s) that mobile stations may be arranged to monitor when seeking service of the femto base station system or when being served by the femto base station system. Further, the femto base station may do this on one or more control channels of its operating carrier frequency and/or one or more control channels of its pilot beacon if applicable.

Figure 3:
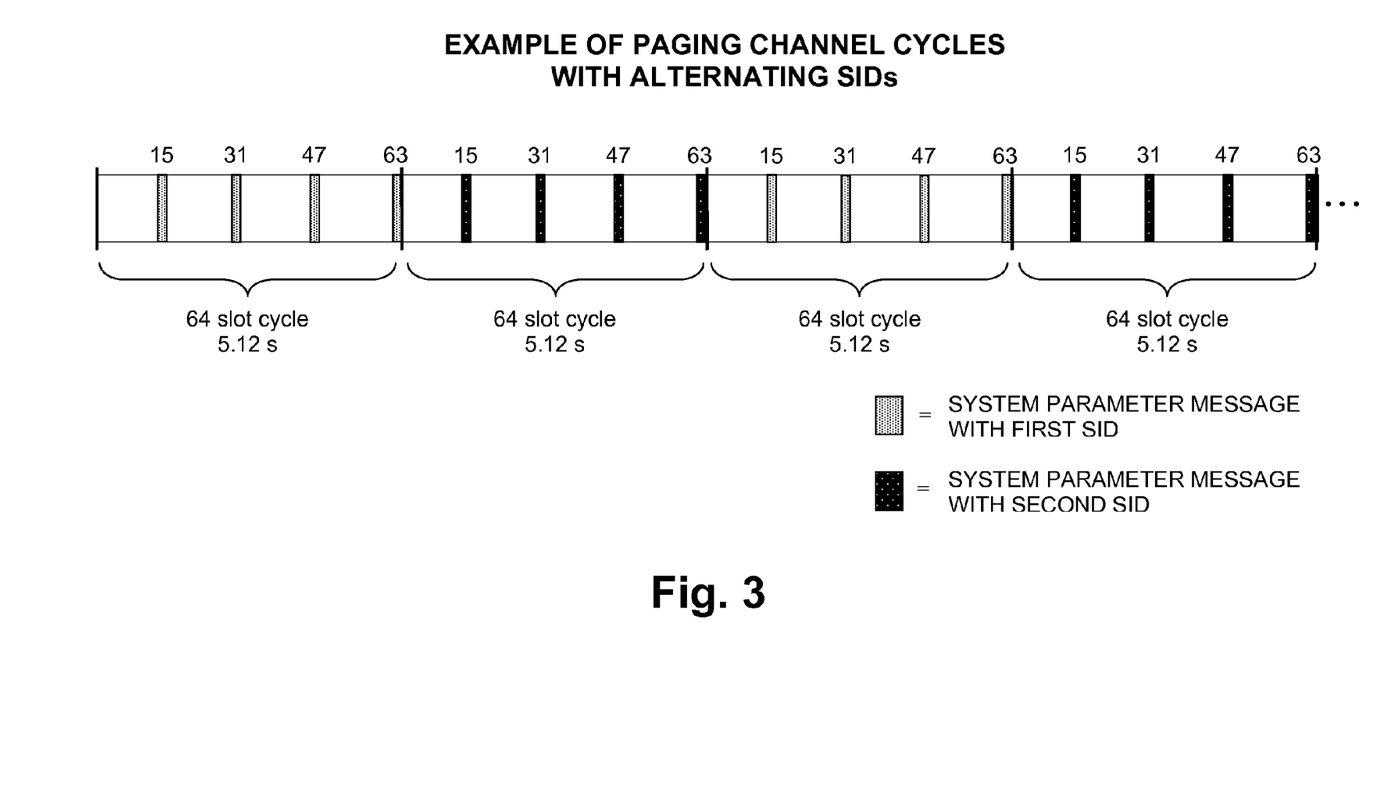
FIG. 3 is an illustration of example alternating of SID values on a control channel.

FIG. 3 depicts one of possibly many ways to implement this alternating of SID values on a paging channel structured as shown in FIG. 2. As shown in FIG. 3, in each system parameter message that the femto base station system broadcasts in a first cycle, the base station may specify as its SID the first SID. In turn, in each system parameter message that the femto base station broadcasts in a next (immediately following) cycle, the base station may specify as its SID the second SID. The femto base station system may then repeat this process for the next two cycles, and so forth. Thus, every other cycle would specify the first SID as the SID of the femto base station system, and the other cycles would specify the second SID as the SID of the femto base station system. It is of course possible that there could be more than two SIDs at issue, and thus, the femto base station could alternate between more than two SIDs. Further, the alternating could be done in other ways as well.

Conveniently with this arrangement, a mobile station that has the first SID listed in its PRL but does not have the second SID listed in its PRL may disregard the second SID when it is broadcast but may then see the first SID in the next cycle of the paging channel. Thus, if such a mobile station is reading the paging channel (e.g., on the pilot beacon) as a basis to determine whether the mobile station should be served by the femto base station, once the first SID is broadcast, the mobile station may then take action to be served by the femto base station.

Likewise, a mobile station that has the second SID listed in its PRL but does not have the first SID listed in its PRL, or has the second SID listed as higher priority than the first SID, might not be attracted by the first SID when it is broadcast, but may then see the second SID in the next cycle of the paging channel. Thus, if such a mobile station is reading the paging channel (e.g., on the pilot beacon) as a basis to determine whether the mobile station should be served by the femto base station, once the second SID is broadcast, the mobile station may respond by taking action to be served by the femto base station.

To the extent mobile stations would monitor the sync channel or another control channel of the femto base station as a basis to determine whether it should be served by the femto base station, the femto base station may similarly alternate between transmission of SID values on that sync channel or other control channel, to help attract various different mobile stations in largely the same manner.

In another respect, to help avoid having a mobile station ping pong as discussed above, the femto base station system may also be arranged to determine which one or more control channel slots the mobile station will be set to read each time the mobile station wakes up, and the femto base station system may broadcast an appropriate SID for that mobile station in one or more of those slots. For example, given knowledge of the paging channel slot at which a registered mobile station is set to wake up, and knowledge that the mobile station would then read the next scheduled system parameter message, the femto base station system may programmatically include the appropriate SID in that next system parameter message.

To determine which SID to broadcast in the determine slot(s) of the paging channel, the femto base station system may include or have access to a copy of the mobile station's PRL or data indicating contents of the mobile station's PRL (such as a PRL version number that may correlate with specific PRL data for instance). In one implementation, for instance, the femto base station system could query another entity such as HLR or a provisioning server (not shown) to obtain this information. Further, the femto base station system may determine a SID of nearby macro base station system, such as by detecting and reading a control channel broadcast of SID from that macro base station system, or by referring to data that indicates base station locations and SIDs to determine that the macro base station is threshold close to the femto base station and has a particular SID.

Given this information, the femto base station may determine whether the mobile station's PRL lists the macro base station's SID. If the femto base station system determines that the mobile station's PRL lists the macro base station's SID, then the femto base station system may select as the appropriate SID either the macro base station SID or a SID that the mobile station's PRL lists with higher priority than the macro base station SID, namely the second SID discussed above. On the other hand, if the femto base station system determines that the mobile station's PRL does not list the macro base station's SID, then the femto base station system may select as the appropriate SID a SID that is listed as high enough priority in the mobile station's PRL, such as a conventional SID of the femto base station system, namely the first SID discussed above.

In practice, the femto base station system may programmatically avoid changing the SID that it broadcasts in a particular slot for a given mobile station if the femto base station system is already intentionally broadcasting another particular SID in that slot for a different mobile station (e.g., another mobile station that is already registered with the femto base station system), possibly conditional on the different mobile station having a higher priority (e.g., service level) than the given mobile station.

Figure 4:
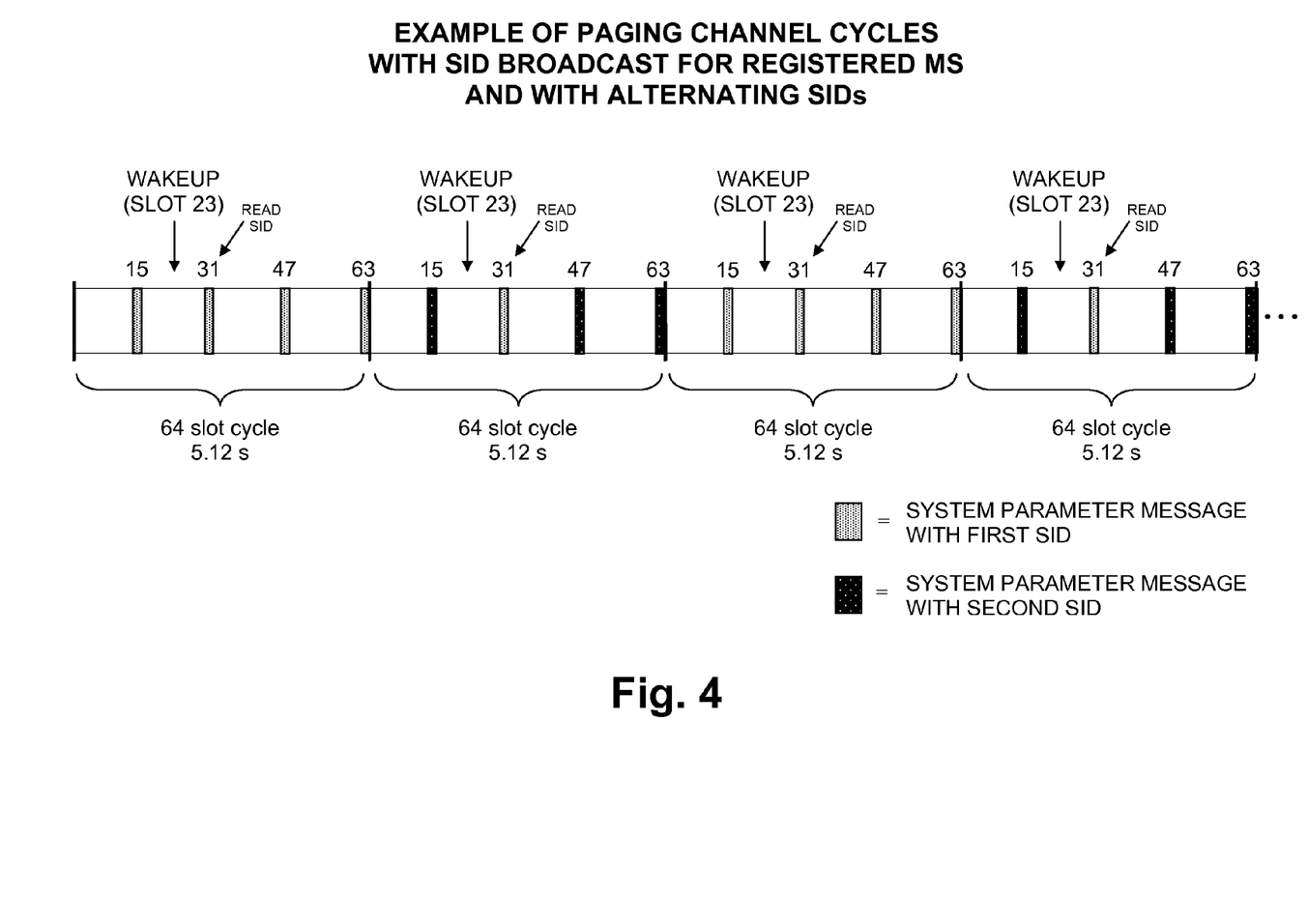
FIG. 4 is an illustration of an example arrangement for broadcasting a SID designed to help keep a mobile station from transitioning from being served by another base station system, while still alternating transmission of SID values.

FIG. 4 depicts an example of this process, with a paging channel structured as in FIG. 3, namely with the alternating SID values. FIG. 4 assumes by way of example that the mobile station is scheduled to wake up at slot 23, and would thus read one or two slots there as well as the system parameter message including the SID at slot 31. As shown, in each cycle at slot 31, the femto base station system would broadcast as its SID a SID that is appropriate for this particular mobile station, to help keep the mobile station from transitioning to be served by the macro base station system.

For instance, if the appropriate SID is the first SID, the femto base station system would broadcast the first SID in the system parameter message at slot 31 of each cycle. As a result, there may be no change to the SID values in every other cycle where the first SID is already being broadcast according to FIG. 3. However, in the other cycles, where the second SID is normally being broadcast (according to the method) at slots 15, 31, 47, and 63, the femto base station system would instead broadcast the first SID in slot 31, as shown.

With this arrangement, each time the mobile station reads the SID broadcast by the femto base station system on the paging channel, the mobile station will read the first SID. Nevertheless, the femto base station system may still continue its alternating between transmitting the first SID and the second SID. Thus, while the femto base station system would be working to prevent the mobile station from transitioning to be served by the macro base station system, the femto base station system would also still be working to attract to the femto base station system mobile stations with varying PRLs.

Figure 5:
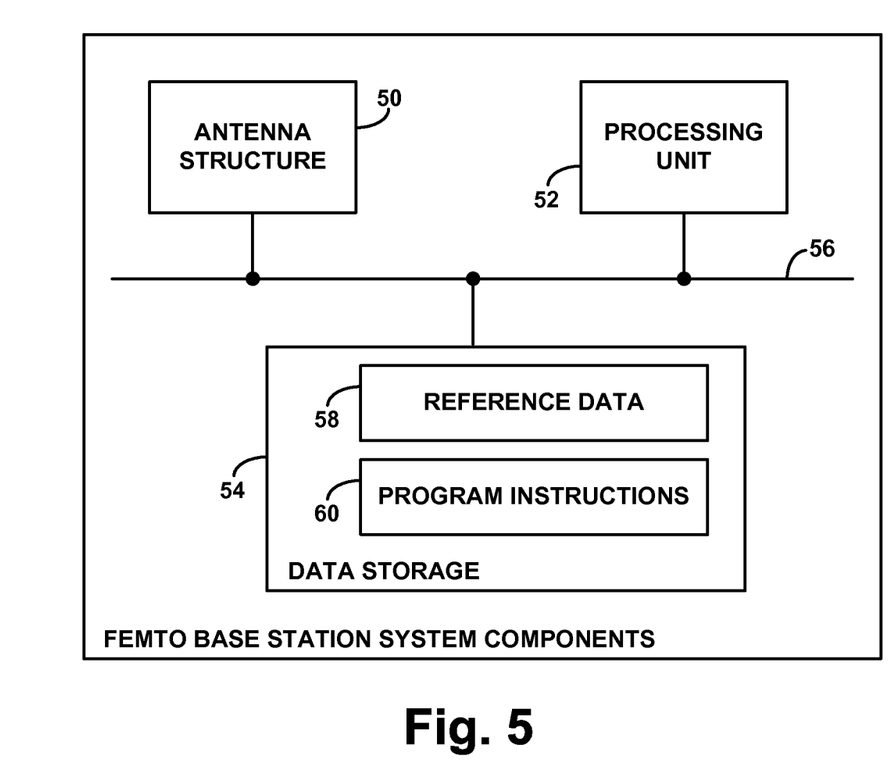
FIG. 5 is a simplified block diagram showing components of a representative femto base station system.

FIG. 5 is next a simplified block diagram showing functional components that could be included in a femto base station system to facilitate carrying out these functions in practice. As shown in FIG. 5, the components include an antenna structure 50, a processing unit 52, and data storage 54, all of which may be communicatively linked together by a system bus, network, or other connection mechanism 56. In the arrangement of FIG. 1, some of these components may be part of femto base station 30 and other components may be part of femtocell controller 40, or the components may be distributed or integrated in other ways.

Antenna structure 50 may comprise one or more antennas of a femto base station, which may work with associated circuitry and/or other components to engage in (transmit and/or receive) air interface communications. For instance, the antenna structure may broadcast various control channel signaling as discussed above, may exchange radio access registration messaging with a mobile station, and may engage in other air interface communication.

Processing unit 52 may then comprise one or more general purpose processors (e.g., INTEL microprocessors) and/or one or more special purpose processors (e.g., application specific integrated circuits or digital signal processors). Further, data storage 54 may comprise one or more volatile and/or non-volatile storage components (non-transitory), such as magnetic, optical, flash, or organic storage components. As shown, data storage 54 may contain reference data 58 and program instructions 60.

Reference data 58 may comprise data indicating which one or more mobile stations are currently registered with the femto base station system and indicating which slots of the paging channel each registered mobile station is scheduled to read. Further, the reference data may comprise for each mobile station a copy or indication of the mobile station's PRL, perhaps received by the femto base station system during registration of the mobile station.

Program instructions 60 may then comprise machine language instructions or the like that are executable by the processing unit 52 to carry out various functions described herein.

For instance, as noted above, the functions may include receiving via the antenna structure 50 from a mobile station a radio access registration request message seeking to register the mobile station to be served by the femto base station system. Further, the functions may include causing the antenna structure to transmit to the mobile station a registration response message to acknowledge registration of the mobile station to be served by the base station system, such as by providing the response message to the antenna structure for transmission to the mobile station.

In addition, the functions may include determining which one or more timeslots of an air interface control channel broadcast by the femto base station system the mobile station will monitor while being served by the femto base station system. For instance, the femto base station system may determine the applicable slot(s) by referring to a slot indication that the mobile station provided during registration or by referring to other data that indicates the slots that the mobile station will monitor.

Further, the functions may include, based on at least the determining, causing the antenna structure to broadcast in the determined one or more timeslots of the air interface control channel, as a SID of the femto base station system, a first SID that is different than a second SID that the antenna structure broadcasts, as the SID of the femto base station system, in one or more other timeslots of the air interface control channel. For instance, if slot 31 is one of the slots that the mobile station will monitor, the femto base station system might broadcast a particular SID in slot 31 of a given cycle but broadcast a different SID in slots 15, 47, and 63 of the cycle. To cause the antenna structure to broadcast the first SID in the determined one or more timeslots (such as in a given one of the one or more timeslots), the processing unit and/or one or more other femto base station system components may provide the SID as data to the antenna structure for the antenna structure to transmit in the appropriate timeslot(s).

Still further, in a scenario where the femto base station system operates on a first frequency channel and the macro base station system operates on a second frequency channel, for instance, the functions may additionally comprise causing the antenna structure to broadcast a pilot beacon on the second frequency channel, to trigger mobile station handoff from the macro base station system to the femto base station system. Here again, causing the antenna structure to broadcast the pilot beacon may involve the processing unit and/or one or more other femto base station system components to provide the pilot beacon signaling to the antenna structure for transmission.

Figure 6:
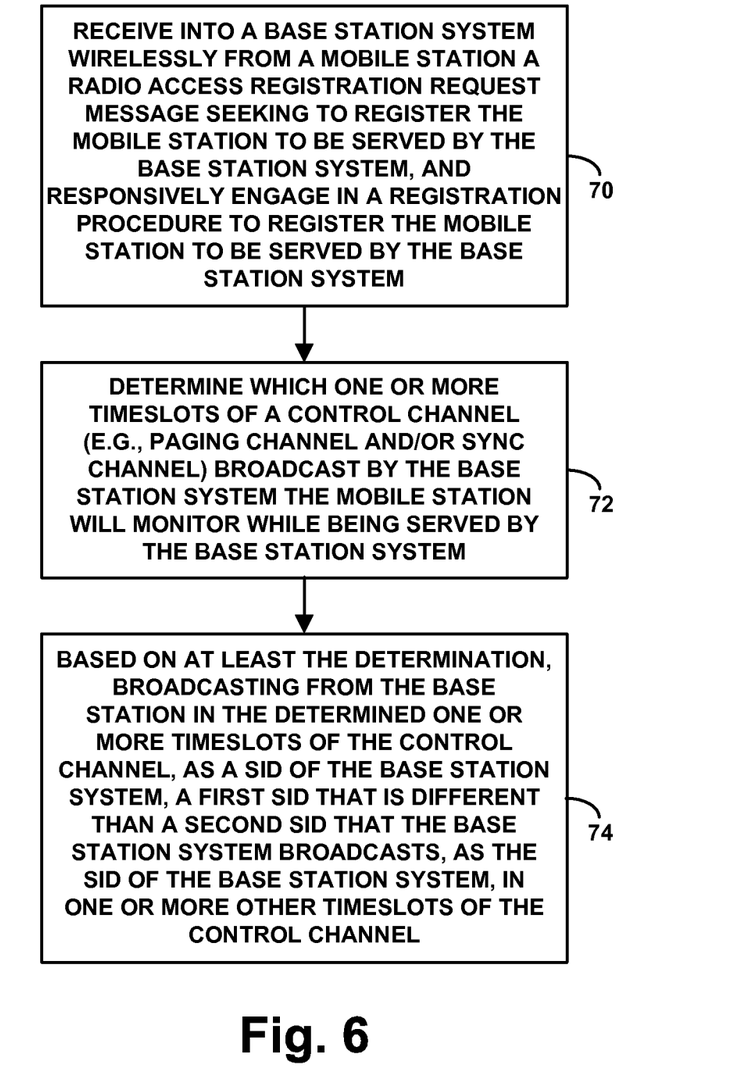
FIG. 6 is a flow chart depicting functions that can be carried out in accordance with an example of the method.

FIG. 6 is next a flow chart depicting an example set of functions that can be carried out in accordance with the present method.

As shown in FIG. 6, at block 70, the method may involve receiving into a base station system wirelessly from a mobile station a radio access registration request message seeking to register the mobile station to be served by the base station system, and responsively engaging in a registration procedure to register the mobile station to be served by the base station system. Further, at block 72, the method may involve the base station determining system which one or more timeslots of a control channel (e.g., paging channel and/or sync channel) broadcast by the base station system the mobile station will monitor while being served by the base station system. And at block 74, the method may involve, based on at least the determining, the base station system broadcasting in the determined one or more timeslots of the control channel, as a SID of the base station system, a first SID that is different than a second SID that the base station system broadcasts, as the SID of the base station system, in one or more other timeslots of the control channel.

In this method, the base station system may be considered a first base station system (e.g., a femto base station system), and the method may then further include (i) the first base station system determining a SID of a second base station system (e.g., a macro base station system) and (ii) the first base station system determining from a PRL of the mobile station, as the first SID to broadcast in the determined one or more timeslots of the control channel, a SID that the PRL gives equal or higher priority than the determined SID of the second base station system. For instance, as noted above, the first base station may wirelessly receive a signal from the second base station and read the SID of the second base station from the received signal. Alternatively, the first base station may refer to data that specifies locations of base station systems and SIDs of base station systems (i) to identify the second base station system as being within a threshold distance from the first base station system and (ii) to determine the SID of the second base station system.

In addition, as noted above, the base station system may alternate between at least broadcasting on the control channel the first SID as the SID of the first base station system and broadcasting on the control channel the second SID as the SID of the first base station system.

Further, as also noted above, the first base station system may operate on a first frequency channel and the second base station system may operate on a second frequency channel. In that case, the method may then further involve the first base station system broadcasting a pilot beacon on the second frequency channel, to trigger mobile station handoff from the second base station system to the first base station system. Moreover, the first base station system may alternate between at least broadcasting on the pilot beacon the first SID as the SID of the first base station system and broadcasting on the pilot beacon the second SID as the SID of the first base station system.

Figure 7:
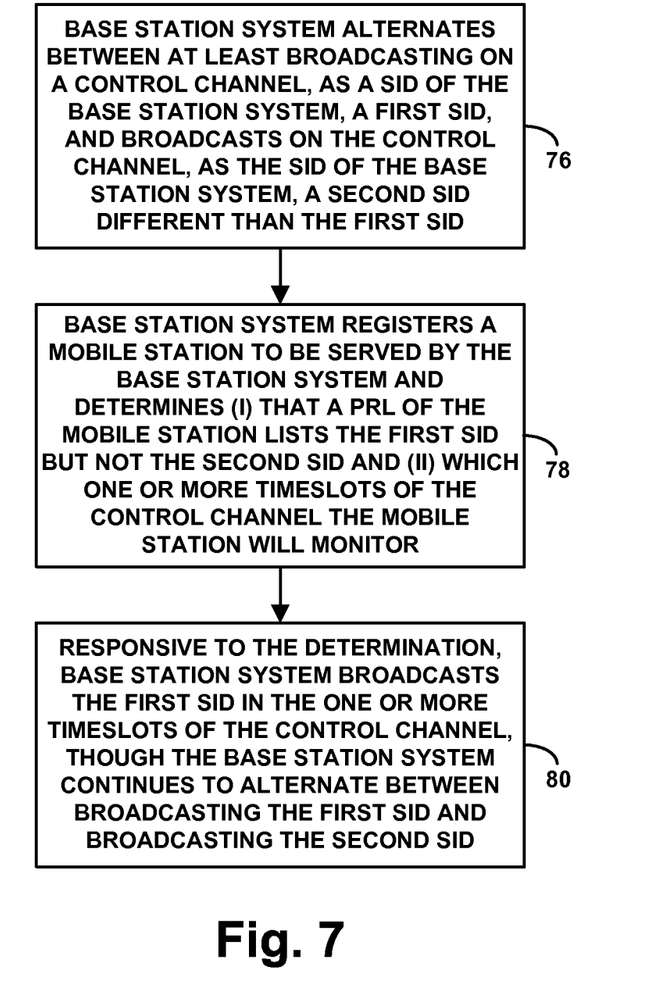
FIG. 7 is another flow chart depicting functions that can be carried out in accordance with an example of the method.

FIG. 7 is next another flow chart depicting an example set of functions that can be carried out in accordance with the present method.

As shown in FIG. 7, at block 76, the method may involve a base station system alternating between at least broadcasting on a control channel (e.g., paging channel and/or sync channel), as a SID of the base station system, a first SID (possibly corresponding with a particular frequency band class), and broadcasting on the control channel, as the SID of the base station system, a second SID (possibly corresponding with another frequency band class) different than the first SID. Further, at block 78, the method may involve the base station system registering a mobile station to be served by the base station system and determining (i) that a PRL of the mobile station lists the first SID but not the second SID and (ii) which one or more timeslots of the control channel the mobile station will monitor. Still further, at block 80, the method may involve, responsive to the determining, the base station system broadcasting the first SID in the one or more timeslots of the control channel, though the base station system continues to alternate between broadcasting the first SID and broadcasting the second SID.

As noted above, the function of alternating between at least broadcasting the first SID and broadcasting the second SID may involve broadcasting the first SID throughout a given control channel cycle (e.g., at each slot where a SID would be broadcast in the cycle), and broadcasting the second SID throughout a next control channel cycle except for in the one or more timeslots in which the base station system broadcasts the first SID.

Further, as also noted above, the base station system may be a femto base station system, and the femto base station system may determine a SID to use as either the first SID or second SID based on a consideration of a SID of a macro base station system. Still further, the femto base station system may operate on a first frequency channel and the macro base station system may operate on a second frequency channel different than the first frequency channel, in which case the method may also involve the femto base station system broadcasting a pilot beacon on the second frequency channel, to trigger mobile station handoff from the macro base station system to the femto base station system. And in line with the discussion above, the femto base station system may alternate between broadcasting on a the pilot beacon, as a SID of the base station system, the first SID, and broadcasting on the pilot beacon, as the SID of the base station system, the second SID.

Exemplary embodiments have been described above. Those skilled in the art will appreciate, however, that many variations from the embodiments are possible while remaining within the spirit and scope of the claims.

We claim:

1. A method comprising:
    receiving into a base station system wirelessly from a mobile station a radio access registration request message seeking to register the mobile station to be served by the base station system, and responsively engaging in a registration procedure to register the mobile station to be served by the base station system, wherein the base station system comprises a base station;
    determining by the base station system which one or more timeslots of a control channel broadcast by the base station system the mobile station will monitor while being served by the base station system; and
    based on at least the determining, the base station broadcasting in the determined one or more timeslots of the control channel, as a System Identifier (SID) of the base station, a first SID that is different than a second SID that the base station broadcasts, as the SID of the base station, in one or more other timeslots of the control channel.

2. The method of claim 1, wherein the base station system is a first base station system and the base station is a first base station, the method further comprising:
    the first base station system determining a SID of a second base station; and
    the first base station system determining from a preferred roaming list (PRL) of the mobile station, as the first SID to broadcast in the determined one or more timeslots of the control channel, a SID that the PRL gives equal or higher priority than the determined SID of the second base station.

3. The method of claim 2, wherein the first base station system determining a SID of the second base station comprises the first base station system wirelessly receiving a signal from the second base station and reading the SID of the second base station from the received signal.

4. The method of claim 2, wherein the first base station system determining a SID of the second base station comprises the first base station system referring to data that specifies locations of base stations and SIDs of base stations (i) to identify the second base station as being within a threshold distance from the first base station and (ii) to determine the SID of the second base station.

5. The method of claim 2, wherein the first base station system is a femto base station system, wherein the first base station comprises a femto base station, wherein the second base station system is a macro base station system, and wherein the second base station comprises a macro base station.

6. The method of claim 5, wherein the femto base station operates on a first frequency channel and the macro base station operates on a second frequency channel, the method further comprising:
the femto base station system broadcasting a pilot beacon on the second frequency channel, to trigger mobile station handoff from the macro base station to the femto base station.

7. The method of claim 6, further comprising:
the femto base station alternating between at least broadcasting on the pilot beacon the first SID as the SID of the femto base station and broadcasting on the pilot beacon the second SID as the SID of the femto base station.

8. The method of claim 1, further comprising:
the base station alternating between at least broadcasting on the control channel the first SID as the SID of the base station and broadcasting on the control channel the second SID as the SID of the base station.

9. The method of claim 1, wherein the control channel is a paging channel.

10. A method operable in a base station system comprising a base station, the method comprising:
the base station alternating between at least broadcasting on a control channel, as a System Identifier (SID) of the base station, a first SID, and broadcasting on the control channel, as a SID of the base station, a second SID different than the first SID;
the base station system registering a mobile station to be served by the base station system and determining (i) that a preferred roaming list (PRL) of the mobile station lists the first SID but not the second SID and (ii) which one or more timeslots of the control channel the mobile station will monitor; and
responsive to the determining, the base station broadcasting the first SID in the one or more timeslots of the control channel, wherein the base station continues the alternating.

11. The method of claim 10, wherein alternating between at least broadcasting the first SID and broadcasting the second SID comprises:
broadcasting the first SID throughout a given control channel cycle; and
broadcasting the second SID throughout a next control channel cycle except for in the one or more timeslots in which the base station broadcasts the first SID.

12. The method of claim 11, wherein the control channel is a paging channel.

13. The method of claim 10, wherein the first SID corresponds with a first frequency band class and the second SID corresponds with a second frequency band class different than the first frequency band class.

14. The method of claim 10, wherein the base station system is a femto base station system, and wherein the base station comprises a femto base station, the method further comprising:
the femto base station system determining a SID to use as one of the first SID and second SID based on a SID of a macro base station.

15. The method of claim 14, wherein the femto base station operates on a first frequency channel and the macro base station operates on a second frequency channel, the method further comprising:
the femto base station broadcasting a pilot beacon on the second frequency channel, to trigger mobile station handoff from the macro base station to the femto base station.

16. The method of claim 15, further comprising the femto base station alternating between at least broadcasting on the pilot beacon, as the SID of the base station, the first SID, and broadcasting on the pilot beacon, as a SID of the base station, the second SID.

17. A base station system comprising a base station, wherein the base station system includes:
an antenna structure for engaging in air interface communication;
a processing unit;
data storage;
program instructions stored in the data storage and executable by the processing unit to carry out functions comprising:
receiving via the antenna structure from a mobile station a radio access registration request message seeking to register the mobile station to be served by the base station system;
causing the antenna structure to transmit to the mobile station a registration response message to acknowledge registration of the mobile station to be served by the base station system;
determining which one or more timeslots of an air interface control channel broadcast by the base station system the mobile station will monitor while being served by the base station system; and
based on at least the determining, causing the antenna structure to broadcast in the determined one or more timeslots of the air interface control channel, as a System Identifier (SID) of the base station, a first SID that is different than a second SID that the antenna structure broadcasts, as the SID of the base station, in one or more other timeslots of the air interface control channel.

18. The base station system of claim 17, wherein the base station system is a first base station system and the base station is a first base station, and wherein the functions further comprise:
determining a SID of a second base station; and
determining from a preferred roaming list (PRL) of the mobile station, as the first SID to broadcast in the determined one or more timeslots of the control channel, a SID that the PRL gives equal or higher priority than the determined SID of the second base station.

19. The base station system of claim 18, wherein the first base station system is a femto base station system, wherein the first base station comprises a femto base station, wherein the second base station system is a macro base station system, and wherein the second base station comprises a macro base station.

20. The base station system of claim 19, wherein the femto base station operates on a first frequency channel and the macro base station operates on a second frequency channel, and wherein the functions further comprise:
   causing the antenna structure to broadcast a pilot beacon on the second frequency channel, to trigger mobile station handoff from the macro base station to the femto base station.

* * * * *